US005503547A

United States Patent [19]

Funahashi et al.

[11] Patent Number: 5,503,547

[45] Date of Patent: Apr. 2, 1996

[54] APPARATUS FOR CONTINUOUSLY MANUFACTURING CORRUGATED SHEET

[75] Inventors: Toshio Funahashi, Kyoto; Koshirou Kitada, Shiga; Masayoshi Oguri; Tetsuo Hirota, both of Kyoto; Yoshio Hori; Toshihiko Matsubara, both of Gifu, all of Japan

[73] Assignees: Nishikawa Rose Co., Ltd.; Uenoyama Kikou Co., Ltd., both of Kyoto; Sunchemical Co., Ltd., Gifu, all of Japan

[21] Appl. No.: 422,768

[22] Filed: Apr. 14, 1995

Related U.S. Application Data

[63] Continuation of Ser. No. 26,764, Mar. 5, 1993, abandoned.

[30] Foreign Application Priority Data

Jun. 24, 1992 [JP] Japan .................................. 4-191619

[51] Int. Cl.$^6$ ...................................................... B29C 53/22

[52] U.S. Cl. ........................................... 425/336; 264/286

[58] Field of Search .................................... 264/286, 287, 264/282; 425/328, 336, 363, 366, 367, 369, 370, 396

[56] References Cited

U.S. PATENT DOCUMENTS

| | | | |
|---|---|---|---|
| 719,490 | 2/1903 | Morgan | 425/369 |
| 1,150,805 | 8/1915 | Beran | 425/369 |
| 1,249,733 | 12/1917 | Ford | 425/369 |
| 1,921,455 | 8/1933 | DeLaney | 264/286 |
| 1,971,667 | 8/1934 | Weeks | 264/286 |
| 2,090,669 | 8/1937 | Dreyfus et al. | 264/286 |
| 2,240,274 | 4/1941 | Wade | 264/286 |
| 2,610,135 | 9/1952 | Kordsemon | 425/369 |
| 2,668,573 | 2/1954 | Larsson | 264/286 |
| 2,814,332 | 11/1957 | Molla | 425/336 |
| 3,514,364 | 5/1970 | Yamaguchi | 425/336 |
| 3,583,030 | 6/1971 | Terry et al. | 425/328 |
| 3,852,012 | 12/1974 | Pfeiffer | 425/363 |
| 3,922,129 | 11/1975 | McDonald | 264/286 |
| 3,973,484 | 8/1976 | Jarret et al. | 425/367 |
| 4,111,733 | 9/1978 | Periers | 156/204 |
| 4,614,632 | 9/1986 | Kezuka et al. | 264/286 |
| 4,925,599 | 5/1990 | Turk et al. | 425/328 |

FOREIGN PATENT DOCUMENTS

| | | | |
|---|---|---|---|
| 2079499 | 11/1971 | France . | |
| 58-19458 | 4/1983 | Japan . | |
| 3-49928 | 3/1991 | Japan | 425/336 |
| 485644 | 8/1936 | United Kingdom . | |

*Primary Examiner*—Jay H. Woo
*Assistant Examiner*—Duane S. Smith
*Attorney, Agent, or Firm*—Oblon, Spivak, McClelland, Maier & Neustadt

[57] ABSTRACT

An apparatus for continuously manufacturing a corrugated sheet having a varying fold width and also having fold lines extending either straight or in wavy or zig-zag fashion in a direction widthwise thereof. The apparatus includes upper and lower toothed rolls each made up of a group of toothed discs and having a circumferential groove defined between each neighboring toothed discs. At least one of the upper and lower toothed rolls is supported for adjustment in position relative to and in a direction towards and away from the other of the upper and lower toothed rolls. Upper and lower guide bars while extending in a direction parallel to the upper and lower toothed rolls are accommodated within the circumferential grooves for movement in a direction towards and away from each other over a distance corresponding to the height of each tooth of any one of the upper and lower toothed rolls. During a continuous passage of the web of sheet through a biting region defined between the upper and lower toothed rolls, the web of sheet is alternately folded by the interaction between the upper and lower toothed rolls to provide the corrugated sheet.

8 Claims, 6 Drawing Sheets

APPARATUS FOR CONTINUOUSLY MANUFACTURING CORRUGATED SHEET

This application is a continuation of application Ser. No. 08/026,764, filed on Mar. 5, 1993, now abandoned.

BACKGROUND OF THE INVENTION

1. Field of the Invention

The present invention relates generally to an apparatus for continuously manufacturing a corrugated sheet. The present invention relates more particularly to the apparatus for the continuous manufacture of the corrugated sheet of a kind that can be used as material for a sleeping pad, a bulky filler material for construction use, cushioning material, a buffering material, material for a gym mattress, a filtering material, and so on.

2. Description of the Prior Art

The Japanese Patent Publication No. 58-19458, published in 1983, discloses an apparatus for manufacturing a corrugated sheet, which comprises an upper and a lower rotary roller having a nipping region defined therebetween, a first conveyor means including first upper and lower conveyor belts and positioned downstream of the nipping region with respect to the direction of feed of a web of sheet to be corrugated, and a second conveyor means including second upper and lower conveyor belts positioned on one side of the first conveyor means remote from the nipping region. The second conveyor means is driven at a speed lower than that of the first conveyor means so that the corrugated sheet having a fold width generally equal to the spacing between the upper and lower conveyor belts of any one of the first and second conveyor means can be manufactured.

The Japanese Laid-open Patent Publication No. 3-49928, published in 1991, discloses a similar apparatus which comprises a pair of toothed wheels for imparting fold lines successively on a web of sheet during the passage of the web of sheet through a gap between the toothed wheels, upper and lower pressing rollers having a gap defined therein for the passage of the web of sheet, which has been imparted with the fold lines, thereby to bend the web of sheet in a generally zig-zag fashion along the fold lines, and upper and lower shaping rollers for imparting wrinkles to the corrugated sheet. In this prior art corrugating apparatus, the speed at which the corrugated sheet is transported through the gap defined between the upper and lower shaping rollers is chosen to be lower than that at which the web of sheet is transported through the gap between the upper and lower pressing rollers, so that the corrugated sheet having a fold width generally equal to the height of each tooth of any one of the upper and lower toothed wheels can be formed.

According to the first mentioned publication, the choice of the difference in speed of transport between the first and second conveyor means and also that of the spacing between the upper and lower conveyor belts of any one of the first and second conveyor means are essential to manufacture the corrugated sheet having a predetermined fold width. Where the fold width is desired to be changed, the difference in speed of transport between the first and second conveyor means and that of the spacing between the upper and lower conveyor belts of any one of the first and second conveyor means have to be altered.

The prior art corrugating apparatus according to the first mentioned publication has a problem in that, since each of the upper and lower conveyor belts of any one of the first and second conveyor means are supported only at its opposite ends, at least respective runs of the upper and lower conveyor belts which confront with each other tends to be slackened, resulting in the formation of the corrugating sheet having an irregular fold width.

On the other hand, according to the corrugating apparatus disclosed in the second mentioned publication, since the tooth grooves in one of the toothed wheels and the tooth tips in the other of the toothed wheels cooperate with each other to define the fold width possessed by the eventually corrugated sheet, it is possible to manufacture the corrugated sheet having a uniform fold width.

However, the prior art corrugating apparatus disclosed in the second mentioned publication has a problem in that, since the fold width of the eventually corrugated sheet is necessarily determined by the interaction between the tooth grooves in one of the toothed wheels and the tooth tips in the other of the toothed wheels, a replacement of the toothed wheels of one particular size with those of a different size is required if the corrugated sheet having a different fold width is desired to be manufactured. This replacement is indeed complicated and time-consuming because the once-installed toothed wheels of one particular size have to be removed from the machine framework, followed by a mounting of the toothed wheels of a different size.

Also, none of the above mentioned two publications disclose means for manufacturing the corrugated sheet having the fold lines which extend in a zig-zag fashion over the width thereof.

In view of the foregoing problems found in the prior art corrugating apparatuses, the inventors of the present invention have carried out an extensive development of an improved corrugating apparatus substantially free from the foregoing problems.

SUMMARY OF THE INVENTION

The present invention therefore provides an improved apparatus fop continuously manufacturing a corrugated sheet, which comprises first and second toothed rolls each having a circumferential groove defined therein. The first and second toothed rolls define a biting region therebetween, and during the passage of the web of sheet through the biting region, fold lines are successively imparted to the web of sheet. At least one of the first and second toothed rolls is supported for adjustment in position relative to and in a direction close towards and away from the other of the first and second toothed rolls. The improved corrugating apparatus also comprises first and second guide bars extending in a direction parallel to a direction of feed of the web of sheet while accommodated within the circumferential grooves for movement in a direction close towards and away from each other over a distance corresponding to the height of each tooth of any one of the first and second toothed rolls.

Therefore, during a continuous passage of the web of sheet through a biting region defined between the first and second toothed rolls, the web of sheet is alternately folded by the interaction between the first and second toothed rolls to provide the corrugated sheet.

According to the present invention, no conveyor belt which tends to be slackened is employed and, instead thereof, the first and second toothed rolls are employed to accomplish a stable manufacture of the corrugated sheet having a uniform fold width. Where the fold width is desired to be changed, no replacement of the first and second toothed rolls are necessary, and at least one of the first and second toothed rolls is adjusted in position relative to the other of the first and second toothed rolls in a direction close towards and away from each other and, at the same time, the first and second guide bar means are similarly adjusted in position in a direction close towards and away from each other.

According to a preferred embodiment of the present invention, the corrugating apparatus further comprises first and second transport means positioned downstream of the biting region between the first and second toothed rolls with respect to the direction of feed of the web of sheet. The first and second transport means apply to the corrugated sheet respective pressing forces acting in directions counter to each other while transporting the corrugated sheet at a speed lower than the speed at which the web of sheet is transported through the biting region. Preferably, at least one of the first and second transport means is supported for adjustment in position in a direction away from and close towards the other of the first and second transport means.

With the first and second transport means driven at the speed lower than the speed of transport of the web of sheet through the biting region, the corrugated sheet emerging outwardly from the biting region can be compacted in a direction lengthwise thereof thereby to minimize any possible loosening of the folds in the corrugated sheet.

Also, according to another preferred embodiment of the present invention, each of the first and second toothed rolls is comprised of a plurality of toothed discs arranged in side-by-side fashion in a direction axially of the roll shaft. In this case, each of the circumferential groove referred to above is defined between the neighboring toothed discs.

According to a further preferred embodiment of the present invention, the toothed discs forming any one of the first and second toothed rolls are arranged with teeth of said toothed disc offset a predetermined angle relative to each other in a direction circumferentially of the toothed discs. This arrangement of the toothed discs for each of the first and second toothed rolls is particularly advantageous for the manufacture of the corrugated sheet having the fold lines that are irregularly bent in a generally zig-zag or wavy fashion over the width of the web of sheet. The resultant corrugated sheets is particularly suited as a core material for use in a sleeping pad and a flooring material, a cushioning material and so on.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
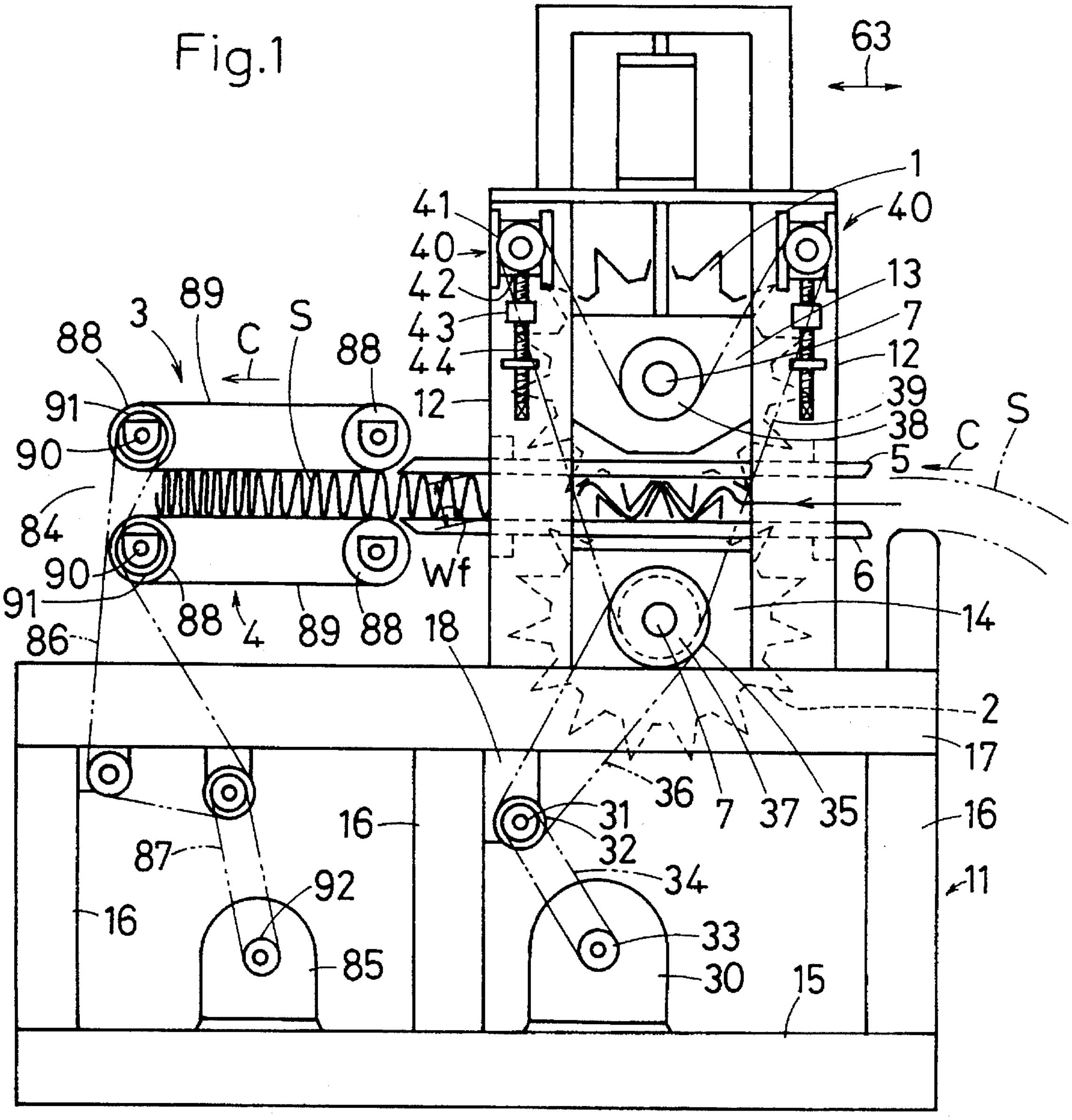
FIG. 1 is a side view of a corrugating machine for continuously manufacturing a web of corrugated sheet according to a first preferred embodiment of the present invention.

FIGS. 1 to 5 illustrate a corrugating machine for the manufacture of a web of corrugated sheet according to a first preferred embodiment of the present invention. Referring first to FIG. 1, the illustrated corrugating machine includes an upper toothed roll 1 and a lower toothed roll 2 positioned one above the other. The upper toothed roll 1 and the lower toothed roll 2 are drivingly meshed with each other so that, during the passage of a web of sheet S in between the upper and lower toothed rolls 1 and 2, the web of sheet S is alternately folded inwardly and outwardly, that is, continuously corrugated. The web of sheet S may be a woven or non-woven fabric of polyester or cotton fibers, or a cardboard. The upper and lower toothed rolls 1 and 2 are mounted on respective roll shafts 7 for rotation together therewith while the roll shafts 7 are journalled to associated bearing housings 13 and 14. The bearing housings 13 and 14 are in turn mounted on spaced apart upright frames 12 which form respective parts of a machine framework 11.

The machine framework 11 includes, in addition to the upright frames 12, a base frame 15, a plurality of legs 16 mounted on the base frame 15 so as to extend perpendicular thereto, a top frame 17 rigidly mounted atop the legs 16, and a bracket 18 secured in part to one of the legs 16 and the top frame 17 and carrying first and second intermediate sprocket wheels 31 and 32 both rotatably mounted thereon for rotation together. The first intermediate sprocket wheel 31 is of a maximum diameter greater than that of the second intermediate sprocket wheel 32. A drive motor 30 having a drive sprocket wheel 33 mounted on a drive shaft of the drive motor 30 for rotation together therewith is rigidly mounted on the base frame 15 with the drive sprocket wheel 33 drivingly coupled with the first intermediate sprocket wheel 31 by means of a substantially endless drive chain 34.

The second intermediate sprocket wheel 32 is drivingly coupled by means of a substantially endless drive chain 36 with a first follower sprocket wheel 35 rigidly mounted on one end of the lower roll shaft 7. A second follower sprocket wheel 37 is rigidly mounted on that end of the lower roll shaft 7 adjacent the first follower sprocket wheel 35 is drivingly coupled with a third follower sprocket wheel 38, rigidly mounted on an adjacent end of the upper roll shaft 7, by means of a substantially endless drive chain 39 via a pair of chain tighteners 40 operable to adjust the tension of the drive chain 39. Thus, it will readily be seen that the upper and lower toothed rolls 1 and 2 are driven in respective directions opposite to each other by the drive of the drive motor 30 that is transmitted to the lower roll shaft 7 by means of the drive chain 36 and in turn to the upper roll shaft 7 by means of the drive chain 39.

The extent to which the upper and lower toothed rolls 1 and 2 are meshed with each other, that is, the degree of engagement between the upper and lower toothed rolls 1 and 2, depends on a "fold width" desired to impart to the web of sheet S. The term "fold width" referred to above and used hereinafter is intended to mean the width Wf of consecutive portions of the web of sheet S which has been corrugated and may correspond to the distance between one fold line to the next adjacent fold line.

When one tooth of the upper toothed roll 1 is engaged the deepest into the adjacent groove between the neighboring teeth of the lower toothed roll 2 leaving a space between the tip of such one tooth of the upper toothed roll 1 and the bottom of such groove between the neighboring teeth of the lower toothed roll 2, which space corresponds to a thickness of the web of sheet S that is sandwiched between such one tooth of the upper toothed roll 1 and the bottom of such groove in the lower toothed roll 2, it may be said that the extent to which the upper and lower toothed rolls 1 and 2 are meshed is maximized, For the purpose of the present invention, this condition is hereinafter referred to as the deepest engagement between the upper and lower toothed rolls 1 and 2.

Although in the practice of the present invention the degree of engagement between the upper and lower toothed rolls 1 and 2 may be shallow, the adjustment to a deep engagement between the upper and lower toothed rolls 1 and 2 is recommended where the web of sheet S which has been corrugated is, after a corrugating process, desired to be fold compact. If the engagement between the upper and lower toothed rolls 1 and 2 is too shallow, the angle of fold between each neighboring blank of the web of sheet being corrugated becomes too small for the eventually corrugated sheet to be pressed in a direction of feed of the web of sheet as indicated by the arrow C in FIG. 1. Accordingly, in such case, the upper and lower toothed rolls 1 and 2 should be so positioned relative to each other that the tooth tip of each tooth of one of the upper and lower toothed rolls 1 and 2 can assume a position deeper than the position intermediate the distance between the tooth tip and the bottom of the groove between each neighboring teeth of the other of the upper and lower toothed rolls 1 and 2.

In the illustrated embodiment, the upper and lower toothed toils 1 and 2 are so positioned relative to each other and so driven in unison with each other in the respective opposite directions that each tooth of one of the upper and lower toothed rolls 1 and 2 can engage in between the neighboring teeth of the other of the upper and lower toothed rolls 1 and 2 with the tooth tip reaching a position generally half the tooth height, the web of sheet S being transported in the direction of feed C is imparted with successive fold lines during its passage through a biting region between the upper and lower toothed rolls 1 and 2 by the interaction between each tooth tip of one of the upper and lower toothed rolls 1 and 2 and the corresponding groove bottom in the other of the upper and lower toothed rolls 1 and 2.

Figure 4:
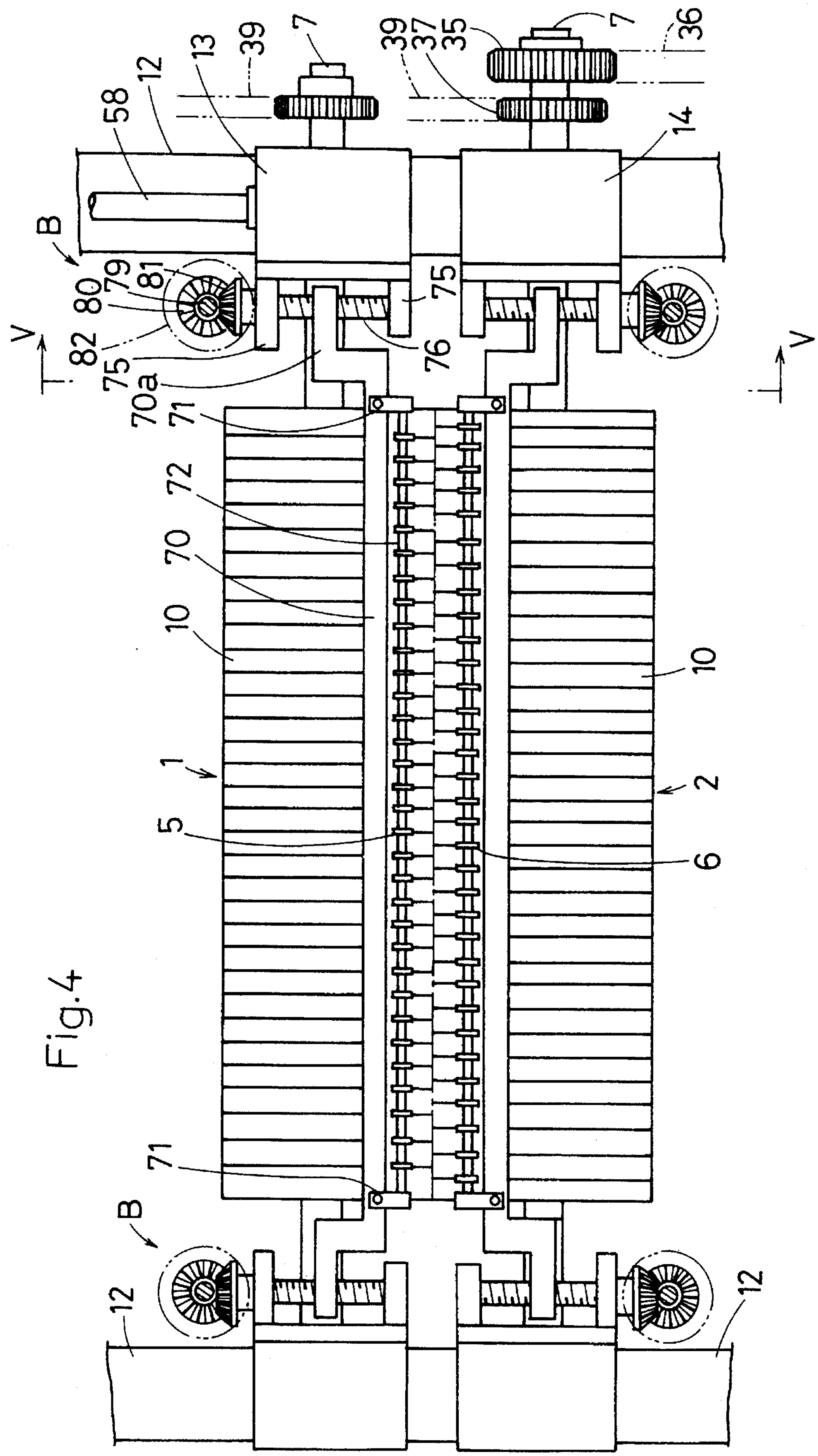
FIG. 4 is a longitudinal view of a portion of the machine shown in FIG. 1.

The upper and lower toothed rolls 1 and 2 are of identical construction and, as best shown in FIG. 4, each of the upper and lower toothed rolls 1 and 2 comprises a group of toothed discs generally identified by 10 mounted on a common support shaft for rotation together therewith and arranged in side-by-side relationship in a direction axially of the common support shaft. This structure of each of the upper and lower toothed rolls 1 and 2 employed in the present invention is quite different from any of a rotary roller disclosed in the Japanese Patent Publication No. 58-19458, published in 1983, and a folding gear disclosed in the Japanese Laid-open Patent Publication No. 3-49928 published in 1991.

Figure 2:
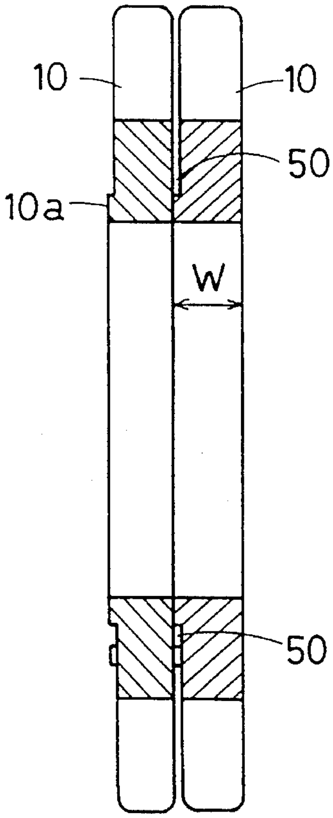
FIG. 2 is a longitudinal sectional view, on an enlarged scale, of some of toothed discs forming any one of upper and lower toothed rolls employed in the machine shown in FIG. 1.

The details of some of the toothed discs 10 forming each of the upper and lower toothed rolls 1 and 2 are best shown in FIG. 2. As shown therein, each of the toothed discs 10 has annular surfaces opposite to each other and also has an axially protruding annular boss 10*a* formed on one of the annular surfaces thereof so that a circumferentially extending groove 50 can be formed between each neighboring toothed discs 10. However, the shape or structure of each toothed disc 10 may not be limited to that shown in and described with reference to FIG. 2, but each toothed disc 10 may have flat annular surfaces opposite to each other and, instead of the annular boss 10*a*, an annular spacer may be interposed between each neighboring toothed discs 10 to form the circumferentially extending groove 50 therebetween.

Although not exclusively limited thereto, each toothed disc 10 preferably has a width, as indicated by W in FIG. 2, which is within the range of 10 to 50 mm. If the width W of each toothed disc 10 is smaller than the lower limit of 10 mm, not only will the respective toothed disc 10 lack a sufficient physical strength, but also assemblage of the toothed discs 10 to form the associated toothed roll 1 or 2 will become complicated and time-consuming. On the other hand, if the width W of each toothed disc 10 is greater than the upper limit of 50 mm, the possibility would undesirably arise that, depending on the type or kind of the web of sheet S to be corrugated, the spacing between guide bars 5 and 6 interposed between the toothed disc 10 of the upper toothed roll 1 and between the toothed disc 10 of the lower toothed roll 2 will expand so excessively as to allow the web of sheet S being corrugated to droop in a direction widthwise thereof.

Again, although not exclusively limited thereto, each toothed disc 10 may be made of iron, stainless steel or plastics. However, the use of polyamide ("Nylon"®) resin is preferred as material for each toothed disc 10 because of a sufficient physical strength, ease to process and inexpensive.

As best shown in FIG. 4, the toothed discs 10 forming the upper toothed roll 1 and the toothed discs 10 forming the lower toothed roll 2 are so positioned as to be offset widthwise (or axially of the respective support shaft) relative to each other a distance corresponding to half the width W of each toothed disc 10. However, in the practice of the present invention, the toothed discs 10 forming the upper toothed roll 1 and the toothed discs 10 forming the lower toothed roll 2 may be so positioned as to align with each other as will be described later.

At least one of the upper and lower toothed rolls 1 and 2 shown in FIG. 1 is supported for movement close towards and away from the other of the upper and lower toothed rolls 1 and 2 to adjust the fold width Wf referred to hereinbefore. For example, one toothed roll supported for movement relative to the other toothed roll is adjustably moved away from the other toothed roll if a relatively large fold width Wf is desired, but is adjustably moved close towards the other toothed roll if a relatively small fold width Wf is desired. Although both of the upper and lower toothed rolls 1 and 2 may be supported for movement close towards and away from each other, all that is necessary in the practice of the present invention is to adjust the distance of separation between the upper and lower toothed rolls 1 and 2 and, therefore, the support of at least one of the upper and lower toothed rolls 1 and 2 for movement close towards and away from the other of the upper and lower toothed rolls 1 and 2 suffices. However, in the illustrated embodiment, the upper toothed roll 1 is supported for movement up and down relative to the lower toothed roll 2 between distant and close positions by means of a roll repositioning mechanism A which will now be described.

Figure 3:
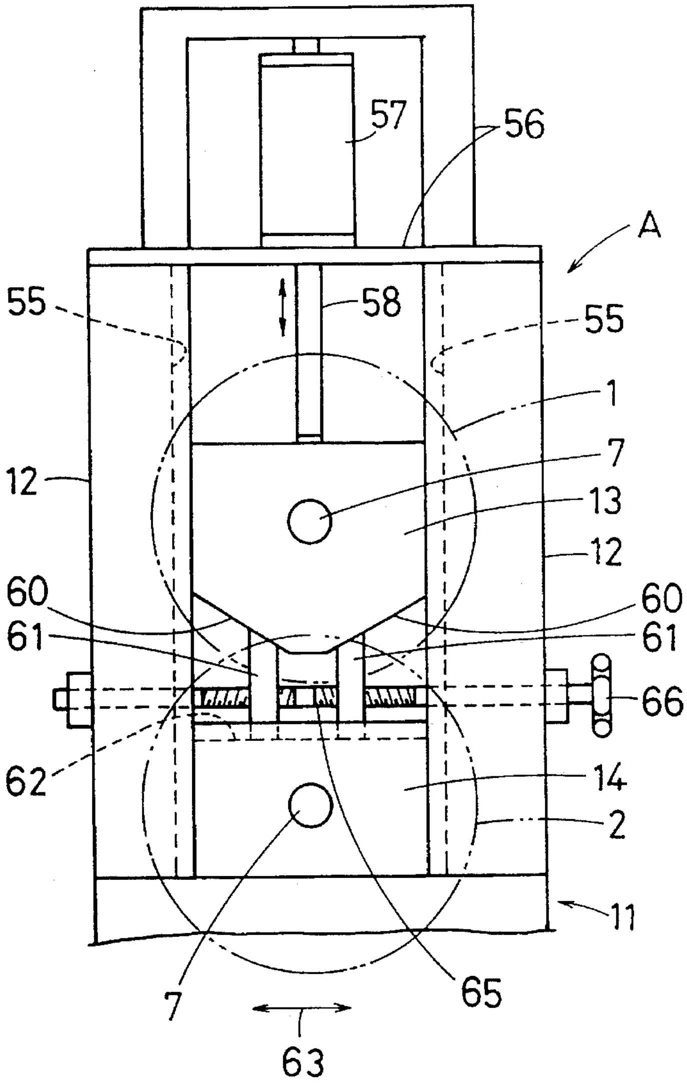
FIG. 3 is a schematic end view of the machine showing a roll repositioning mechanism.

Referring to FIG. 3 showing the details of the roll repositioning mechanism 4 employed for each end of the upper roll shaft 7, the bearing housing 13 supporting the upper roll shaft 7 has its opposite side portions slidably received within guide grooves 55 defined in the associated upright frames 12 to permit the bearing housings 13 to slide up and down along the guide grooves 55. A pneumatically operated cylinder 57 having a piston rod 58 is rigidly mounted on a support structure 56 mounted atop the upright frames 12 so as to bridge therebetween. The piston rod 58 is movable relative to the body of the pneumatic cylinder 57 between projected and retracted positions and has its free end coupled with the adjacent bearing housing 13.

The bearing housing 13 has a lower end generally tapered downwardly to define support faces 60 that extend so as to converge with each other. Positioned beneath the bearing housing 13 is a pair of slide pieces 61 for the support thereon of the bearing housing 13 in contact with the associated support faces 60. Opposite ends of the respective slide pieces 61 remote from the bearing housing 13 are received in a slide groove 62, defined in an upper end of the bearing housing 14 supporting the lower roll shaft 7 of the lower toothed roll 2, for sliding movement in a direction perpendicular to the direction of movement of the bearing housing 13. A threaded bolt 65 having oppositely extending helical grooves defined therein and rotatably supported at its opposite end portions by the upright frames 12 extends through the slide pieces 61 so that, when a handle wheel 66 secured to one end of the threaded bolt 65 is turned in either direction, the slide pieces 61 can approach close towards and separate away from each other. Thus, it will readily be seen that, as the slide pieces 61 move close towards each other as a result of the turn of the handle wheel 66 in one direction, the bearing housing 13 is moved upwardly, but as the slide pieces 61 move away from each other as a result of the turn of the handle wheel 66 in the opposite direction, the bearing housing 13 is moved downwardly. In this way, the degree of engagement between the upper and lower toothed rolls 1 and 2 can be adjusted.

The roll repositioning mechanism A is employed in association with each of the opposite ends of the upper roll support shaft 7 and, therefore, the bearing housing 13 which is not discussed in the foregoing description is equally supported in a manner identical with that discussed in the foregoing description. Hence, so far illustrated, the actual adjustment of the degree of engagement between the upper and lower toothed rolls 1 and 2 is carried out by manually turning both of the handle wheels 66 provided on respective sides thereof one for each roll repositioning mechanism A. However, those skilled in the art can readily conceive the possibility of use of a linkage system by which a single handle wheel suffices to operate both of the roll repositioning mechanisms A.

As indicated above, the upward or downward movement of the upper toothed roll 1 relative to the lower toothed roll 2 varies the distance between the upper and lower roll shafts 7 in FIG. 1. Once this adjustment is carried out, the drive chain 39 will become loosened. In order for the drive chain 39 to be kept taught in pursuit of the adjustment of the distance between the upper and lower roll shafts 7, the chain tighteners 40 are employed on the respective upright frames 12. These chain tighteners 40 are of identical construction and, therefore, reference will now be made to only one of the chain tighteners 40 for the discussion of the details thereof.

Each of these chain tighteners 40 includes a nut member 43 rigidly secured to the associated upright frame 12, an adjustment screw rod 44 threadingly extending through the nut member 43, a bearing 42 held in contact with an upper end of the adjustment screw rod 44 and carrying an idle sprocket wheel 41 around which a portion of the drive chain 39 is turned. This bearing 42 is mounted on the associated upright frame 12 for movement up and down in a direction generally parallel to the direction of movement of the upper toothed roll 1 close towards and away from the lower toothed roll 2. The upward or downward movement of the bearing 42 is accomplished by manually turning the adjustment screw rod 44 in either direction about the longitudinal axis of the adjustment screw rod 44, thereby adjusting the tension of the drive chain 39.

The upper and lower guide bars 5 and 6 shown in FIG. 1 serve to guide the web of sheet S to be corrugated into the biting region between the upper and lower toothed rolls 1 and 2 and then to guide the web of sheet S, which has been corrugated, towards a transport gap defined between upper and lower sheet transport means 3 and 4. It is to be noted that, during the passage of the web of sheet S through the biting region between the upper and lower toothed rolls 1 and 2, the upper and lower guide bars 5 and 6 also serve as tooth bottoms at which fold lines are formed in the web of sheet S by the upper and lower toothed rolls 1 and 2. After the web of sheet S emerges outwardly from the biting region between the upper and lower toothed rolls 1 and 2, the upper and lower guide bars 5 and 6 serve to retain the fold width Wf in the web of sheet S which has been corrugated, so that the web of sheet S subsequently enters the transport gap between the upper and lower sheet transport means 3 and 4 in the form as folded in a generally zig-zag fashion.

The upper guide bars 5 extend in a direction conforming to the direction of feed shown by the arrow C while accommodated within the respective circumferential grooves 50 each defined between each neighboring toothed discs 10 forming the upper toothed roll 1. Similarly, the lower guide bars 6 extend in a direction parallel to the upper guide bars 5 while accommodated within the respective circumferential grooves 50 each defined between the each neighboring toothed discs 10 forming the lower toothed roll 2. The upper guide bars 5 are supported for movement up and down in a direction conforming to the direction of movement of the upper roll shaft 7 over a distance generally equal to the height of each tooth of the upper toothed roll 1 and, similarly, the lower guide bars 6 are supported for movement up and down in a direction conforming to the direction of movement of the upper roll shaft 7 over a distance generally equal to the height of each tooth of the lower toothed roll 2.

The upper and lower guide bars 5 and 6 are driven up and down by respective guide bar shifting mechanisms B of identical construction. In describing the details of the guide bar shifting mechanisms B, reference will now be made only to the guide bar shifting mechanism B associated with the upper guide bars 5 for the sake of brevity because of the identical construction with reference to FIG. 4.

The upper guide bars 5 are supported by elongated support members 70 positioned on upstream and downstream sides of the upper toothed roll 1, respectively, so as to extend in a direction parallel to the roll shaft 7. More specifically, each of the elongated support members 70 carries a support rod 72 connected thereto at its opposite ends by means of respective fixtures 71 so as to extend parallel to the associated elongated support member 70, which support rod 72 extends through respective holes defined in adjacent end portions of the upper guide bars 5. Thus, the upper guide bars 5 are supported by the elongated support members 70 through the support rod 72. For the purpose which will become clear from the subsequent description, opposite ends 70*a* of each of the elongated support members 70 have internally threaded holes defined therein.

The guide bar shifting mechanism B is employed for each end of the upper guide bars 5 and includes an externally threaded bolt 76 rotatably supported by spaced apart, upper and lower brackets 75 fixed to the bearing housing 13. This externally threaded bolt 76 threadingly extends through the corresponding internally threaded hole in the associated end 70*a* of the elongated support member 70. Therefore, when the externally threaded bolts 76 are turned in either direction about the longitudinal axes thereof, the upper guide bars 5 can be shifted upwardly or downwardly in a direction perpendicular to the roll shaft 7 relative to the upper toothed roll 1.

Figure 5:
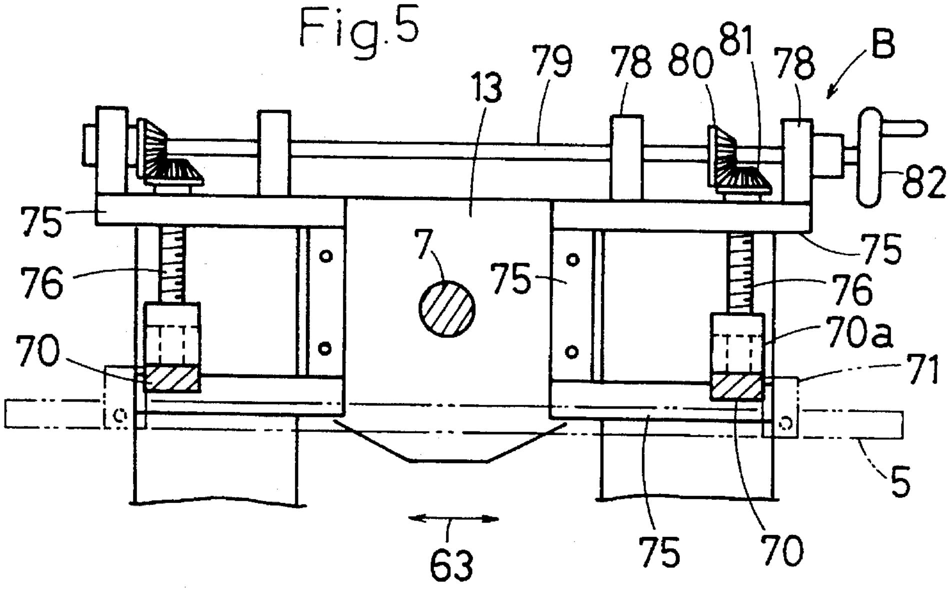
FIG. 5 is a schematic end view of the machine, showing a guide bar shifting mechanism employed therein.

As best shown in FIG. 5, the upper brackets 75 fast or rigid with the bearing housing 13 have respective pairs of bearing members 78 fixedly mounted thereon, and a connecting shaft 79 is rotatably supported by the pairs of the bearing members 78 so as to extend perpendicular to any one of the externally threaded bolts 76. This connecting shaft 79 has two drive bevel gears 80 mounted thereon for rotation together therewith, which gears 80 are drivingly meshed with respective driven bevel gears 81 rigidly mounted on the associated externally threaded bolts 76. Therefore, when a handle wheel 82 rigidly mounted on one end of the connecting shaft 79 is turned in either direction, the externally threaded bolts 76 are driven about their own longitudinal axes, causing the elongated support members 70 and, hence, the upper guide bars 5 carried by the support members 70 to shift upwardly or downwardly.

The guide bar shifting mechanism B of the above described construction is employed in association with each end of the upper toothed roll 1 as shown in FIG. 4 and, therefore, by turning the handle wheels 82 the upper guide bars 5 can be shifted upwardly or downwardly. At this time, care is required to avoid any possible tilt of the elongated support members 70 relative to the upper toothed roll 1. However, this inconvenience can be eliminated if any suitable linkage is employed to drivingly connect the guide bar shifting mechanisms B together with a single handle wheel employed and this system can readily be conceived by those skilled in the art.

It is to be noted that the number of any one of the upper guide bars 5 and the lower guide bars 6 may not correspond to the number of the circumferential grooves 50 each defined between the neighboring toothed discs 10 in the upper or lower toothed roll 1 and 2, but the upper or lower guide bars 5 or 6 may be employed for every two or three circumferential grooves 10 in the upper or lower toothed roll 1 or 2 particularly where each toothed disc 10 has a relatively small width W (FIG. 2).

As hereinbefore described, the distance over which any one of the upper guide bars 5 and the lower guide bars 6 is defined so as to correspond to the height of each tooth of the associated toothed roll 1 or 5. This is for the purpose of the following reason. It is to be noted that, while the following reasoning is made in connection with only the upper guide bars 5, a similar reasoning applies to the lower guide bars 6 because the upper and lower guide bars 5 and 6 are supported in a similar manner, but reverse in position relative to each other.

If undersurfaces of the upper guide bars 5 are held at a level above the bottom of one of the teeth of the upper toothed roll 1 when oriented downwards towards the lower toothed roll 6, the upper guide bars 5 fail to serve not only as the tooth bottom of the upper toothed roll 1, but also to guide and retain the corrugated sheet S, in view of the fact that, in the illustrated embodiment, the web of sheet S is corrugated by the interaction between the tooth bottom of any one of the teeth of the upper toothed roll 1 and the tooth tip of any one of the teeth of the lower toothed roll 2. On the other hand, if the undersurfaces of the upper guide bars 5 are held at a level below the tooth tip of such one of the teeth of the upper toothed roll 1, the upper and lower toothed rolls 1 and 2 fail to bite the web of sheet S being transported through the biting region therebetween. Accordingly, in the present invention, the upper guide bars 5 are supported for movement up and down within the distance corresponding to the height of each tooth of the associated toothed roll 1 or 5. It is to be noted that the above described distance over which the upper guide bars 5 are shifted up and down is a maximum permitted value and, if a smaller value is considered desirable for the distance of movement of the upper guide bars 5, the upper guide bars 5 may be made movable up and down over a distance which may be smaller than the height of each tooth of the upper toothed roll 1.

A description similar to, but reverse to the foregoing applies to the lower guide bars 6.

The shifting of the upper and lower guide bars 5 and 6 up and down, but in respective directions opposite to each other, may be, or may not be, linked with the corresponding movement of the upper and lower toothed rolls 1 and 2 up and down. In the illustrated embodiment, the upper and lower toothed rolls 1 and 2 are drivingly associated with the upper and lower guide bars 5 and 6, respectively, and therefore, it is necessary that, after the upper and lower guide bars 5 and 6 have been shifted close towards or away from each other in unison with the corresponding movement of the upper and lower toothed rolls 1 and 2, the upper and lower guide bars 5 and 6 must be further shifted to a predetermined position in unison with each other. On the other hand, where the upper and lower toothed rolls 1 and 2 are not drivingly associated with the upper and lower guide bars 5 and 6, respectively, it is necessary that, when the upper and lower toothed rolls 1 and 2 are moved away from each other, care should be taken to avoid any possible separation of the upper and lower guide bars 5 and 6 from the corresponding circumferential grooves 50 in the toothed discs 10 forming the respective upper and lower toothed rolls 1 and 2.

Referring again to FIG. 1, the upper and lower transport means 3 and 4 are used to transport a downstream portion of the web of sheet S, which has been corrugated, towards a delivery end 84. These upper and lower transport means 3 and 4 are drivingly synchronized with each other so as to transport the corrugated web of sheet S at a speed lower than the speed at which an upstream portion of the web of sheet S being corrugated is fed through the biting region between the upper and lower toothed rolls 1 and 2 so that the corrugated downstream portion of the web of sheet S can be compacted in a direction conforming to the direction C of feed of the web of sheet S.

In the illustrated embodiment, each of the upper and lower transport means 3 and 4 is employed in the form of a substantially endless belt conveyor, but may be in the form of a group of juxtaposed rollers. Although so far illustrated each of the upper and lower transport means 3 and 4 comprises a single endless belt conveyor, it may comprise a plurality of endless belt conveyors arranged in a row extending parallel to the direction C of feed of the web of sheet S. The corrugated web of sheet S successively emerging outwardly from the transport gap between the upper and lower transport means 3 and 4 is further passed through a heating station, at which heating is applied thereto so as to fix the fold lines, and then through a laminating station to form a laminated product using the corrugated web of sheet S.

As shown in FIG. 1, each of the upper and lower transport means 3 and 4 comprises a generally endless belt 89 trained around a pair of rolls 88 while extending therebetween, and a drive motor 85 common to the upper and lower transport means 3 and 4. One of the rolls 88 of each transport means 3 and 4 which is positioned downstream of the direction C of feed of the web of sheet S has a stud shaft 90 coupled thereto for rotation together therewith, the stud shaft 90 having a respective sprocket wheel 91 rigidly mounted thereon.

The sprocket wheels 91 of the respective upper and lower transport means 3 and 4 are drivingly coupled with a sprocket wheel 92, rigidly mounted on a drive shaft of the drive motor 85, through a generally endless intermediate drive chain 86 and then through a generally endless drive chain 87.

As is the case with the upper and lower toothed rolls 1 and 2, the upper and lower transport means 3 and 4 are also supported for movement up and down, i.e., away from and close towards each other, in unison with the movement of the upper and lower toothed rolls 1 and 2 in a direction substantially perpendicular to the direction C of feed of the web of sheet S to accommodate a varying height of the corrugated sheet S. As a matter of course, since in the illustrated embodiment only the upper toothed roll 1 is supported for movement up and down relative to the lower toothed roll 2, only the upper transport means 3 is supported for movement up and down relative to the lower transport means 4, however both may be supported for movement up and down where both of the upper and lower toothed rolls 1 and 2 are supported for movement up and down.

Figure 6:
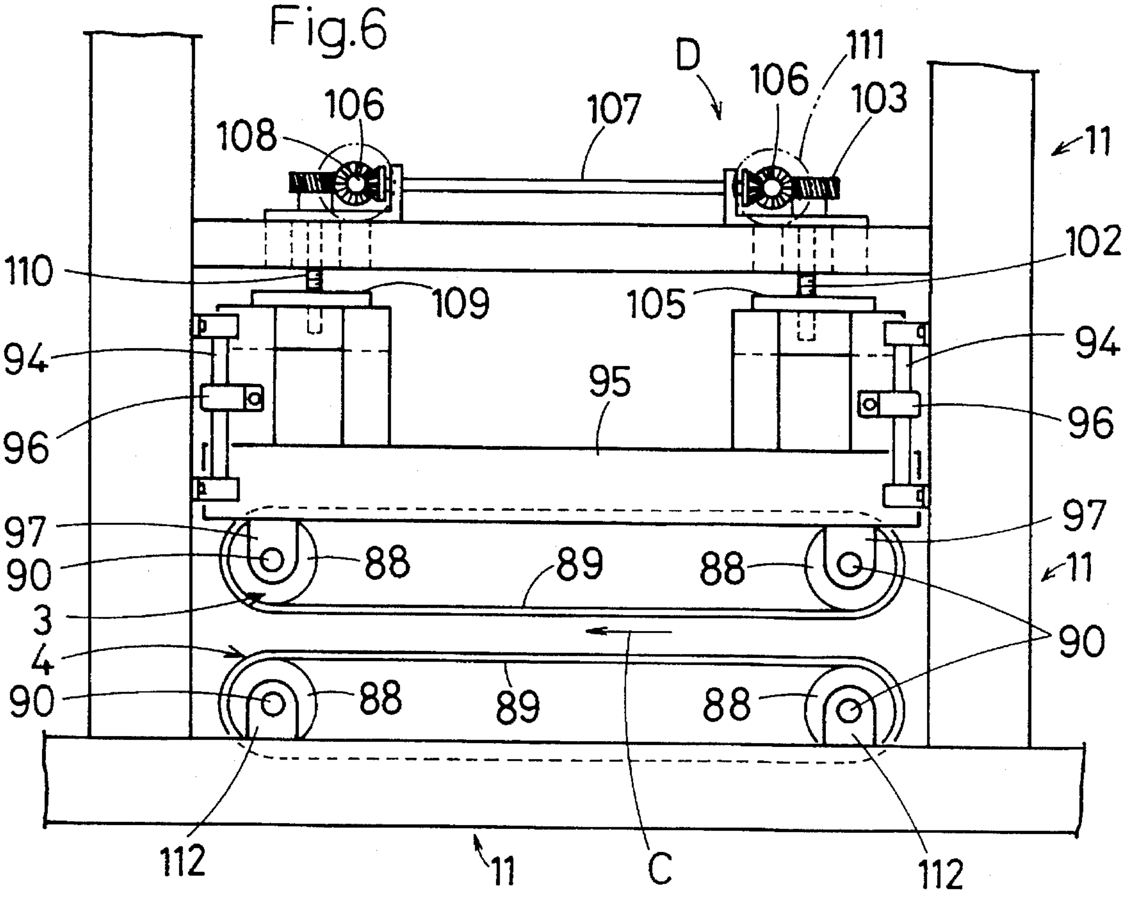
FIG. 6 is a schematic longitudinal view of the machine, showing an adjustment mechanism for adjustably moving upper and lower transport means employed in the machine.
Figure 7:
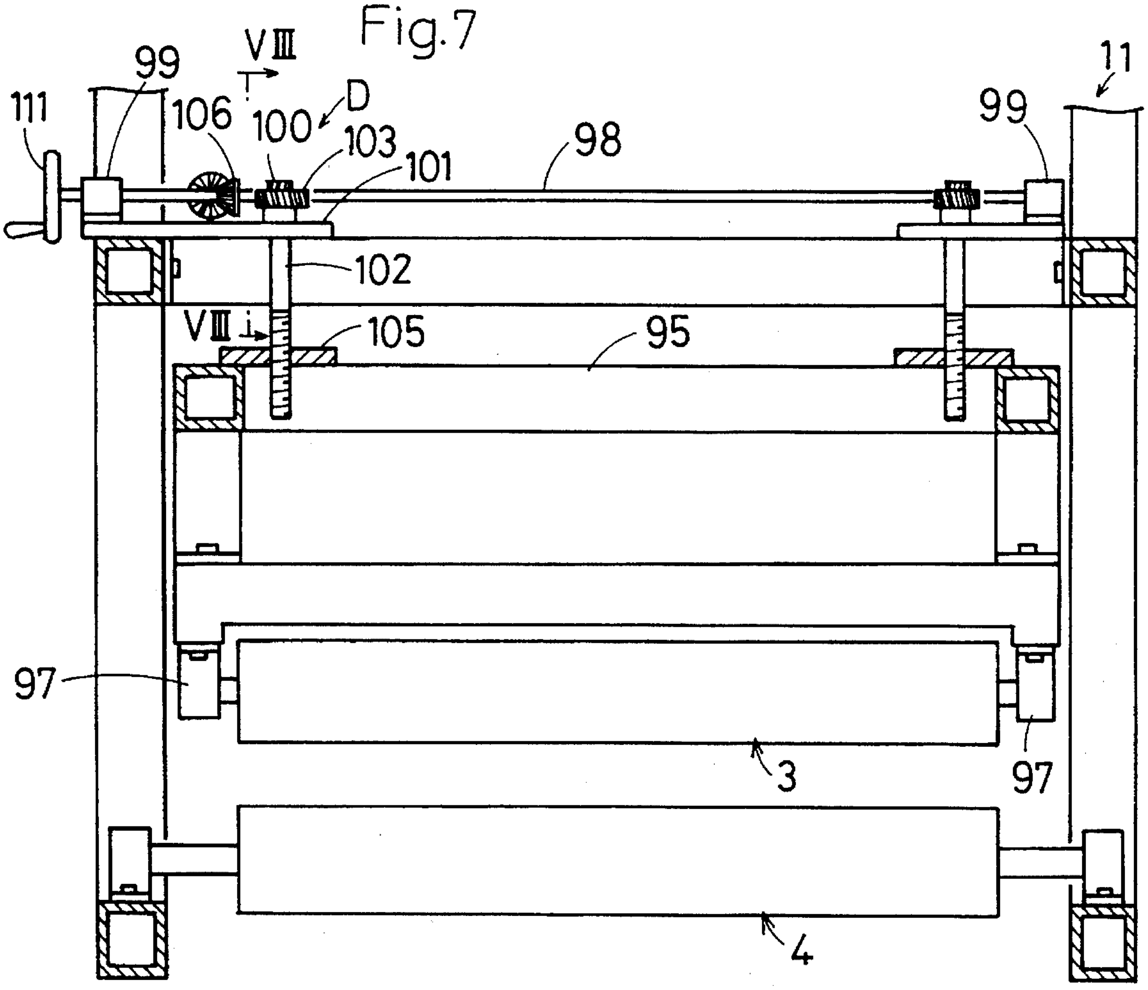
FIG. 7 is a schematic end view of a portion of the machine shown in FIG. 6.
Figure 8:
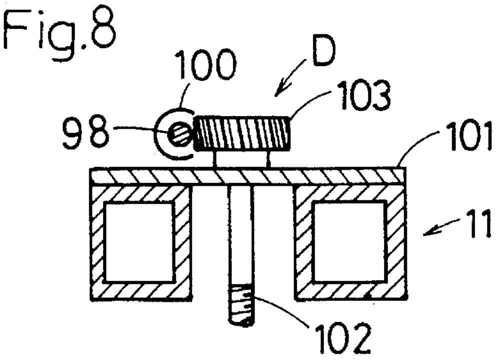
FIG. 8 is a cross-sectional view taken along the line VIII—VIII in FIG. 7.

With reference to FIGS. 6 to 8, a mechanism D for moving the upper transport means 3 in unison with the upper toothed roll 1 will now be described.

The machine framework 11 further includes four guide posts 94, two positioned on upstream and downstream sides of the upper transport means 3 while the remaining two are positioned on respective sides of the upper transport means 3. A carriage 95 having four slide bearings 96 rigidly secured thereto is supported by the guide posts 94 by means of the slide bearings 96 axially slidably mounted thereon and, accordingly, the carriage 95 is movable up and down relative to the machine framework 11 with the slide bearings 96 guided along the respective guide posts 94. The endless belt conveyor forming the upper transport means 3 are carried by the carriage 95 by means of brackets 97 secured to an undersurface of the carriage 95 and bearing opposite ends of stud shafts 90 protruding coaxially outwardly from the associated rolls 88.

As best shown in FIG. 7, an operating rod 98 is rotatably supported by bearings 99 rigidly mounted atop the machine framework 11. This operating rod 98 has a worm gear 100 mounted thereon for rotation together therewith as best shown in FIG. 8. On the other hand, the machine framework 11 has an externally threaded drive rod 102 rotatably mounted thereon by means of a fitting plate 101, the drive rod 102 having a worm wheel 103 rigidly mounted on an upper end thereof for rotation together therewith and constantly meshed with the worm gear 100. The drive rod 102 is in turn received threadingly in an internally threaded hole defined in a plate 105 that is secured to the carriage 95 as shown in FIG. 7.

The operating rod 98 is operatively coupled, as shown in FIG. 6, with a driven rod 108 positioned on a downstream side of the upper transport means 3 by means of a connecting rod 107 extending perpendicular thereto and having a bevel gear mechanism 106 provided on each end of said connecting rod 107. The driven rod 108 is operatively coupled with the carriage 95 in a manner similar to the operating rod 98 and does therefore transmit a rotary drive to an externally threaded drive rod 110 threadingly extending through a plate 109 that is rigidly mounted on the carriage 95 in a manner similar to the plate 105. Thus, it will readily be understood that, when a handle wheel 111 in FIG. 7 rigidly mounted on one end of the operating rod 98 is manually turned, the drive rods 102 and 110 in FIG. 6 are rotated simultaneously to move the carriage 95 and, hence, the upper transport means 3 up and down in a direction close towards and away from the lower transport means 4. It is to be noted that the lower transport means 4 in the illustrated embodiment is immovably mounted on the machine framework 11 through support brackets 112.

As hereinbefore described, in the corrugating apparatus according to the foregoing embodiment of the present invention, each of the upper and lower toothed rolls 1 and 2 comprises a group of the toothed discs 10 rigidly mounted on the respective roll shaft 7 in side-by-side relationship in a direction axially of the roll shaft 7 for rotation together therewith while the circumferential groove 50 is defined between each neighboring toothed discs 10. The upper toothed roll 1 is supported for adjustment in position in a direction close towards and away from the lower toothed rolls 2.

The upper and lower guide bars 5 and 6 extend parallel in a direction perpendicular to the direction of movement of such one of the upper and lower toothed rolls 1 and 2 relative to the other of the upper and lower toothed rolls 1 and 2 while accommodated within the circumferential grooves 50 in the upper and lower toothed rolls 1 and 2, respectively. The upper guide bars 5 are supported for adjustment in position in a direction perpendicular to the longitudinal axis of the upper toothed roll 1 over the distance corresponding to the height of each tooth of the upper toothed roll 1 while moving within the associated circumferential grooves 50 in the upper toothed roll 1. Similarly, the lower guide bars 6 are supported for adjustment in position in a direction perpendicular to the longitudinal axis of the lower toothed roll 2 and in a direction close towards and away from the upper guide bars 5 over the distance corresponding to the height of each tooth of the lower toothed roll 2 while moving within the associated circumferential grooves 50 in the lower toothed roll 2.

As a matter of course, the adjustment in position of the upper toothed roll 1 in a direction close towards and away from the lower toothed roll 2 and that of the upper and lower guide bars 5 and 6 are effected in consideration of the thickness of a web of sheet S to be corrugated and/or when the fold width Wf in the corrugated sheet is desired to be changed.

Following the corrugating station at which the upper and lower toothed rolls 1 and 2 are disposed together with the upper and lower guide bars 5 and 6, the upper and lower transport means 3 and 4 are disposed while defining a transport passage therebetween. At least one of the upper and lower transport means 3 and 4, which is associated with the at least one of the upper and lower toothed rolls 1 and 2 that is adjustably supported is supported for adjustment in position relative to the other of the upper and lower transport means 3 and 4 to accommodate the varying fold width Wf.

More specifically, where the corrugated sheet S having a relatively large fold width Wf is desired to be manufactured, the upper toothed roll 1 is moved close towards the lower toothed roll 2 to a position sufficient to leave a space, corresponding to the thickness of a web of sheet S to be corrugated, between the tooth tip of one of the teeth of the upper toothed roll 1, which is then closest to the lower toothed roll 2, and the tooth bottom of the corresponding tooth of the lower toothed roll 2 then receiving such one of the teeth of the upper toothed roll 1. At the same time, the upper guide bars 5 are adjusted in position to assume a position level with the tooth bottom of the one of the teeth of the upper toothed roll 1 while the lower guide bars 6 are similarly adjusted in position to assume a position level with the tooth bottom of such corresponding tooth of the lower toothed roll 2.

Alternatively, if desired, the upper guide bars 5 may be adjusted in position to assume a position above the level of the tooth bottom of the one of the teeth of the upper toothed roll 1 while the lower guide bars 5 may be similarly adjusted in position to assume a position below the level of the tooth bottom of such corresponding tooth of the lower toothed roll 2, so that, in corrugating the web of sheet S, only the tooth bottoms in the upper toothed roll 1 and those in the lower toothed roll 2 are utilized with neither the upper guide bars 5 nor the lower guide bars 6 being utilized.

By so doing, the corrugated sheet having the largest possible fold width Wf corresponding to the maximum distance between the tooth tip of one of the teeth of the upper toothed roll 1, which is then closest to the lower toothed roll 2, and the tooth tip of the tooth of the lower toothed roll 2 then receiving such one of the teeth of the upper toothed roll 1 can be manufactured.

On the other hand, where the corrugated sheet S having a relatively small fold width Wf is desired to be manufactured, the upper toothed roll 1 is moved away from the lower toothed roll 2 to a position sufficient to leave a relatively large space between the tooth tip of one of the teeth of the upper toothed roll 1, which is then closest to the lower toothed roll 2, and the tooth bottom of the corresponding tooth of the lower toothed roll 2 then receiving such one of the teeth of the upper toothed roll 1. At the same time, the upper guide bars 5 are lowered to a position where the undersurfaces of the respective upper guide bars 5 assume a position spaced a distance, generally equal to the thickness of the web of sheet S to be corrugated, upwardly from the tooth tip of the teeth of the lower toothed roll 2 then closest to the upper toothed roll 1, while the lower guide bars 6 are lifted to a position where the upper surfaces of the respective lower guide bars 6 assume a position spaced a similar distance, generally equal to the thickness of the web of sheet S to be corrugated, downwardly from the tooth tip of the teeth of the upper toothed roll 1 then closest to the lower toothed roll 2. Once these adjustments have been carried out, the undersurfaces of the upper guide bars 5 serve as the tooth bottoms in the upper toothed roll 1 while the upper surfaces of the lower guide bars 6 serve as the tooth bottoms in the lower toothed roll 2, so as to eventually provide the corrugated sheet having the small fold width Wf corresponding to the distance between the tooth tips of the respective teeth of the upper and lower toothed rolls 1 and 2.

Figure 9:
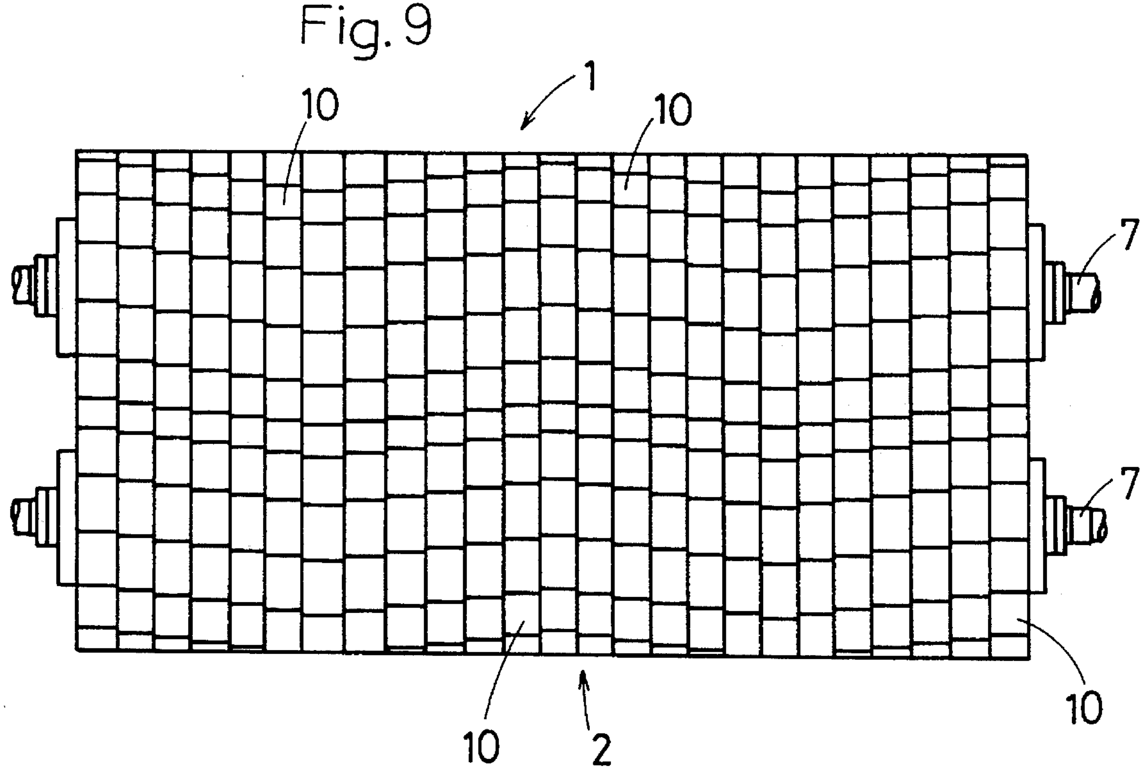
FIG. 9 is a schematic longitudinal view of upper and lower toothed rolls according to a second preferred embodiment of the present invention.

FIG. 9 illustrates a second preferred embodiment of the present invention. In this embodiment of FIG. 9, the upper and lower toothed rolls 1 and 2 are similar in structure to those employed in the foregoing embodiment, but differ therefrom in respect of the manner in which the toothed discs 10 for each of the upper and lower toothed rolls 1 and 2 are arranged in a manner different from those of any one of the upper and lower toothed rolls 1 and 2 employed in the foregoing embodiment.

Referring now to FIG. 9, the toothed discs 10 forming each of the upper and lower toothed rolls 1 and 2 are mounted on the roll shaft 7 for rotation together therewith, but in a circumferentially alternately offset relationship with each other so that the tooth tips of those toothed discs 10 depict a generally zig-zag or wavy rows in a direction axially of the roll shaft 7.

In assembling each of the upper and lower toothed rolls 1 and 2, the associated toothed discs 10 may be mounted on the respective roll shaft 7 either by setting the individual toothed discs 10 onto the roll shaft 7 by means of one or a plurality of set screws passing through the disc 10 radially with one toothed disc 10 circumferentially offset a predetermined angle relative to the next adjoining toothed disc 10, or by clamping the toothed discs 10 by end plates (not shown) positioned on outer sides of the outermost discs 10 and fixed to the roll shaft 7 with a plurality of press-fitting bolts screwed in the end plates to press the outermost discs 10 in a direction axially inwardly, after the toothed discs 10 have been circumferentially offset a predetermined angle.

As described above, in the corrugating apparatus utilizing the upper and lower toothed rolls 1 and 2 according to the second embodiment of the present invention, the toothed discs 10 in each of the upper and lower toothed rolls 1 and 2 are angularly offset relative to each other in a direction circumferentially of the associated roll shaft 7 with the axial rows of the teeth tips extending in a generally zig-zag fashion. Therefore, each fold line formed in the corrugated sheet manufactured by the corrugating apparatus according to the embodiment of FIG. 9 extends a correspondingly zig-zag fashion over the width of the corrugated sheet.

Hereinafter, a specific example of the manner by which the corrugated sheet is manufactured will be described for the sole purpose of illustration of the present invention.

EXAMPLE

The upper and lower toothed rolls 1 and 2, each having a maximum outer diameter of 30 cm with the teeth having a height of 4.3 cm, and each being comprised of the toothed discs 10 of 15 mm in width W, were mounted on the machine framework 11 as shown in FIG. 1. Arrangement was so made that, by the drive of the drive motor 30, the lower toothed roll 2 was driven at a speed of 1.5 meter per minute while the upper toothed roll 1 was driven at the same speed as that of the lower toothed roll 2 by means of the drive chain 39. The upper guide bars 5 each being 50 cm in length, 1.5 cm in height and 2 mm in width were inserted in the circumferential grooves 50 each defined between each neighboring toothed discs 10 forming the upper toothed roll 1. Similarly, the lower guide bars 6 each being 50 cm in length, 1.5 cm in height and 2 mm in width were inserted in the circumferential grooves 50 each defined between each neighboring toothed discs 10 forming the lower toothed roll 2.

A web of sheet S to be corrugated was a textile cloth made of fibers of high melting point and those of low melting point mixed together. During the passage of the web of sheet S through the biting region between the upper and lower toothed rolls 1 and 2, the web of sheet S was successively bitten with the teeth of one of the upper and lower toothed rolls 1 and 2 successively engaged in the tooth grooves of the other of the upper and lower toothed rolls 1 and 2 and was, after it emerged outwardly from the biting region and guided by the downstream portions of the guide bars 5 and 6, continuously transported towards the transport gap between the upper and lower transport means 3 and 4.

The upper and lower transport means 3 and 4 were of a substantially endless belt conveyor type and were positioned downstream of the upper and lower guide bars 5 and 6 with respect to the direction of feed of the web of sheet S, through which the web of sheet S having the fold lines formed thereon was transported at a speed of 0.7 meter per minute. The web of sheet S having the fold lines formed thereon were compacted in a direction lengthwise thereof during the passage thereof through the transport gap between the upper and lower transport means 3 and 4 and was subsequently transported to the heating station at which heat was applied to the corrugated sheet S through a heating means (not shown) to melt the low melting point resin forming one of materials for the web of sheet S thereby to fix the fold lines. The corrugated sheet S so manufactured has a fold width Wf of 3.3 cm and was used as material for a sleeping pad.

Another corrugated sheet S similar to that described above, but having a fold width of 2.3 cm for use as material for a sleeping pad was manufactured in a manner similar to that described above. However, to manufacture the corrugated sheet having the fold width of 2.3 cm, the roll repositioning mechanisms A shown in FIG. 3 were operated by turning the handle wheel 66 to lift the upper toothed roll 1 a distance of 2.8 cm above the position which had been occupied by the upper toothed roll 1 during the manufacture of the corrugated sheet S having the fold width of 3.3 cm. At the same time, the guide bar shifting mechanisms B were operated by turning the handle wheels 82 to lower the upper guide bars 5 a distance of 3.3 cm and lift the lower guide bars 6 a distance of 0.5 cm, from the respective position which had been occupied by the upper and lower guide bars 5 and 6 during the manufacture of the corrugated sheet S having the fold width of 3.3 cm.

As the foregoing description has made it clear, the corrugating apparatus according to the present invention is effective to continuously manufacture the corrugated sheet by the interaction between the upper and lower toothed rolls 1 and 2 then rotated in the opposite directions counter to each other so as to mesh with each other thereby to form the fold lines. Therefore, the corrugated sheet so manufactured has a uniform fold width.

Also, the use of the upper and lower guide bars 5 and 6 movably accommodated within the circumferential grooves 50 formed in the respective upper and lower toothed rolls 1 and 2 makes it possible to manufacture the corrugated sheet having a varying fold width Wf with no need to replace the upper and lower toothed rolls 1 and 2 of one particular size with those of a different size. This can be accomplished by adjusting the position of both of the upper and lower guide bars 5 and 6 relative to the associated upper and lower toothed rolls 1 and 2 in a direction perpendicular to the longitudinal axis of any one of the toothed rolls 1 and 2.

If the toothed discs 10 forming each of the upper and lower toothed rolls 1 and 2 are mounted on the roll shaft 7 without being circumferentially offset, that is, with the teeth of all of the toothed discs 10 aligned in a direction axially of the roll shaft 7, such as in the first preferred embodiment of the present invention, the corrugating apparatus of the present invention is effective to provide the corrugated sheet having all of the fold lines extending straight over the width of the sheet. On the other hand, if the toothed discs 10 forming each of the upper and lower toothed rolls 1 and 2 are mounted on the roll shaft 7 in the circumferentially offset relationship with each other, that is, with the teeth of all of the toothed discs 10 alternately offset a predetermined angle in a direction circumferentially thereof, such as in the second preferred embodiment of the present invention, the corrugating apparatus of the present invention is effective to provide the corrugated sheet having all of the fold lines extending in a generally zig-zag fashion over the width of the sheet. In either case, the resultant corrugated sheet may find a wide range of applications, for example, not only material for the sleeping pad, but also a floor material, a bulky filler material for construction use, cushioning material, a buffering material, material for a gym mattress, a filtering material, and so on.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. Apparatus for continuously manufacturing corrugated sheet, which comprises:

first and second toothed rolls relatively movably positioned one above the other in a meshed relationship with each other and defining a biting region therebetween for a passage of a web of sheet to be corrugated, said web being imparted with fold lines while passing through the biting region, each of said first and second toothed rolls being spaced from each other and having a plurality of circumferential grooves defined therein so as to extend circumferentially thereof;

movable first and second guide bar means extending in a direction parallel to a direction of feed of the web of sheet while accommodated within the circumferential grooves in the first and second toothed rolls, respectively, said first and second guide bar means being operable to contact upper and lower surfaces of the web of sheet to guide said web of sheet;

means for supporting and moving one of the first and second toothed rolls relative to the other of the first and second toothed rolls in a direction towards and away from the other of the first and second toothed rolls; and means for supporting and moving each of the first and second movable guide bar means towards and away from each other over a distance corresponding to a height of each of teeth of any one of the first and second toothed rolls;

wherein a movement amount of said one toothed roll relative to said other toothed roll and a movement amount of said first and second guide bars are based on a thickness of the web of sheet to be corrugated and a fold width of the corrugated sheet.

2. The apparatus for continuously manufacturing the corrugated sheet as claimed in claim 1, further comprising first and second transport means positioned downstream of and spaced a distance from the biting region for transporting the corrugated sheet while sandwiching the corrugated sheet from opposite directions, said first and second transport means being driven in unison with each other at a speed lower than the speed at which the web of sheet is passed through the biting region, and means for supporting and moving one of the first and second transport means relative to and in a direction towards and away from the other of the first and second transport means.

3. The apparatus for continuously manufacturing the corrugated sheet as claimed in claim 1, wherein said means for supporting and moving the first and second guide bar means includes a pair of support members for each of said first and second guide bar means, said pair of support members being movable towards and away from each other.

4. The apparatus for continuously manufacturing the corrugated sheet as claimed in claim 3, further comprising a pair of bearing means for each of the first and second toothed rolls for bearing opposite ends of the respective toothed roll, wherein said pair of the support members have opposite ends thereof slidably coupled to the bearing means of said pair.

5. The apparatus for continuously manufacturing the corrugated sheet as claimed in claim 1, wherein each of said first and second toothed rolls comprises a plurality of toothed discs arranged in side-by-side fashion in a direction axially thereof, and wherein each one of said circumferential grooves is defined between the neighboring toothed discs.

6. The apparatus for continuously manufacturing the corrugated sheet as claimed in claim 5, wherein the toothed discs are rigidly mounted on a roll shaft for rotation together therewith.

7. The apparatus for continuously manufacturing the corrugated sheet as claimed in claim 5, wherein said toothed discs forming any one of the first and second toothed rolls are arranged with teeth of said toothed disc offset at an angle relative to each other in a direction circumferentially of the toothed discs.

8. The apparatus for continuously manufacturing the corrugated sheet as claimed in claim 7, wherein the toothed discs are rigidly mounted on a roll shaft for rotation together therewith.

* * * * *